US005643991A

United States Patent [19]

Stipe et al.

[11] Patent Number: 5,643,991
[45] Date of Patent: Jul. 1, 1997

[54] COPOLYESTER COMPOSITIONS CONTAINING CARBON BLACK

[75] Inventors: Candace Michele Stipe; Scott Arnold Hanson; Richard Leon McConnell, all of Kingsport, Tenn.

[73] Assignee: Eastman Chemical Company, Kingsport, Tenn.

[21] Appl. No.: 439,597

[22] Filed: May 12, 1995

[51] Int. Cl.⁶ .................................................... C08K 3/04
[52] U.S. Cl. ........................... 524/496; 524/505; 525/55; 525/88; 525/94; 525/64; 525/165
[58] Field of Search ................................ 524/496, 505; 525/88, 94, 95, 98, 55, 64, 165, 176

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 4,034,013 | 7/1977 | Lane | 260/835 |
| 4,066,576 | 1/1978 | Bork et al. | 252/511 |
| 4,096,202 | 6/1978 | Farnham et al. | 260/873 |
| 4,267,286 | 5/1981 | Campbell | 525/176 |
| 4,369,282 | 1/1983 | Campbell | 524/445 |
| 4,482,460 | 11/1984 | Kandler et al. | 210/706 |
| 4,522,979 | 6/1985 | Chung et al. | 525/66 |
| 4,554,314 | 11/1985 | Chung et al. | 525/67 |
| 4,559,164 | 12/1985 | Kostelnik et al. | 252/511 |
| 4,654,400 | 3/1987 | Lohmeijer et al. | 525/64 |
| 4,699,942 | 10/1987 | Weaver et al. | 524/338 |
| 4,876,033 | 10/1989 | Dziurla et al. | 252/511 |
| 5,143,649 | 9/1992 | Blackledge et al. | 252/511 |
| 5,330,827 | 7/1994 | Hansen | 428/283 |
| 5,352,401 | 10/1994 | Dalgewicz, III et al. | 525/66 |

FOREIGN PATENT DOCUMENTS

91/10237   7/1991   WIPO.

OTHER PUBLICATIONS

Brunauer, et al, *Journal of the American Chemical Society*, vol. 60, Feb. 1938, pp. 309–319.
Derwent Abstract WO 9110237, Jul. 1991.

*Primary Examiner*—Edward J. Cain
*Attorney, Agent, or Firm*—Betty J. Boshears; Harry J. Gwinnell

[57] ABSTRACT

This invention relates to a blend comprising:
(a) one or more substantially amorphous copolyester resins having a degree of crystallinity of less than 20 percent;
(b) from about 5 to about 25 weight percent carbon black; and
(c) from about 7 to about 30 weight percent of an impact modifier,
wherein the total of the weight percentages of (a), (b), and (c) equal 100 percent.

This invention is advantageous in that it provides the advantages of good electroconductivity, lack of brittleness, ability to thermoform into desired shapes, good impact strength, good sealing characteristics and acceptable environmental image.

19 Claims, No Drawings

COPOLYESTER COMPOSITIONS CONTAINING CARBON BLACK

FIELD OF THE INVENTION

The field of this invention relates to substantially amorphous copolyester compositions containing carbon black.

BACKGROUND OF THE INVENTION

Polyester materials are widely used as extrusion and injection molding resins for applications such as fibers, films, automotive parts, food and beverage containers and the like. Commonly used polyesters include poly(ethylene terephthalate) (PET), poly(1,4-butylene terephthalate) (PBT), and poly(1,4-cyclohexylenedimethylene terephthalate) (PCT). These crystallizable polymers generally have good heat resistance and high glass transition temperatures. However, they sometimes show crystallization-induced brittleness during extrusion and thermoforming operations, especially when loaded with high concentrations of fillers such as carbon black, talc and the like.

Conductive polymers are known to be useful for packaging materials for packaging of electrostatic sensitive electronic components.

Conductive polymers are particularly useful in the tape and reel market for packaging of electrostatic sensitive electronic components. For example, heavily filled polymer compositions based on poly(vinyl chloride) (PVC), polycarbonate, and high impact polystyrene have been evaluated for this application. The optimum fitness-for-use criteria for this market include electrostatic dissipation properties, dimensional stability, acceptable slitting characteristics, peelable seal characteristics to cover tapes, and low migration levels of condensable materials from the package to the packaged components. Conductive high impact polystyrene and PVC compositions are deficient in impact strength and sealing characteristics. The poor environmental image of PVC is also detrimental to its use in this application. Polycarbonate compositions are expensive and have impact problems as well as sheet drying requirements prior to thermoforming operations. Therefore, there is a need for a conductive polymer which overcomes the above described deficiencies.

WO 91/10237 discloses an anti-static composition containing conductive polymers with increased conductivity from at least one non-conductive matrix polymer and at least two additives. In one of the examples, copolyester of poly (ethylene terephthalate) containing cyclohexanedimethanol and ethylene glycol combined with polyaniline is shown. This disclosure does not show the use of carbon black or impact modifiers, either singly or in combination with the conductive copolyester.

U.S. Pat. No. 4,876,033 (1989) assigned to Bayer A. G. discloses molding resins based on blends of polycarbonate, a poly(alkylene terephthalate) such as PET, PBT, or PCT, carbon black, and graphite.

U.S. Pat. No. 4,699,942 (1987) assigned to Eastman Kodak Company discloses molding compositions based on PET, a low molecular weight polyethylene mold release agent, talc, carbon black, a hindered phenolic antioxidant and optionally reinforcing glass fibers.

U.S. Pat. No. 4,559,164 (1985) assigned to General Electric Company discloses a plastic composition characterized by electroconductivity and comprising up to 90 weight per cent PBT, carbon black, and from 1 to 50 weight per cent of a Bisphenol A polycarbonate, glass fibers and/or rubbery polymers. Although these crystalline PBT-based blends have desirable elctroconductivity properties, extruded sheets are brittle in the machine direction and they are difficult to thermoform into desired shapes.

U.S. Pat. No. 4,369,282 (1983) assigned to General Electric Company—This patent describes modified thermoplastic polyester compositions which comprise a PBT resin, optionally a PET resin, a modifier comprising a combination of a polyacrylate resin or a vinyl aromatic-diene block copolymer resin and a poly(1,3-butylene terephthalate) resin and optionally a filler and/or reinforcing agent and/or a flame retardant. Such compositions do not contain carbon black and would not be suitable for applications requiring electroconductivity.

U.S. Pat. No. 4,267,286 (1981) assigned to General Electric Company—This patent describes thermoplastic polyester compositions based on PBT which are similar in composition to those described in U.S. Pat. No. 4,369,282. Again, the compositions contain no carbon black and are not suitable for applications requiring electroconductivity.

U.S. Pat. No. 4,554,314 (1985) assigned to Mobay Chemical Corp. discloses thermoplastic molding compositions which are blends of poly(alkylene terephthalate) and polycarbonate resins containing shell/core graft modified polybutadiene rubber modifiers. The compositions contain no carbon black and are not suitable for applications requiring electroconductivity.

None of the above described references solve all of the numerous problems in the art of lack of appropriate electroconductivity, brittleness, difficulty in thermoforming into desired shapes, deficiencies in impact strength and sealing characteristics, poor environmental image, and impact strength problems. Therefore, there is a need in the art for a conductive polymer which overcomes the above described deficiencies.

SUMMARY OF THE INVENTION

This invention relates to
(a) one or more substantially amorphous copolyester resins having a degree of crystallinity of less than 20 percent;
(b) from about 5 to about 25 weight percent carbon black; and
(c) from about 7 to about 30 weight percent of an impact modifier,
wherein the total of the weight percentages of (a), (b), and (c) equal 100 percent.

This invention also relates to carbon-containing molded articles produced by extrusion thermoforming, injection molding or compression molding of the blends of the invention.

The invention further relates to a method of preparing the blends of the invention comprising the steps of liquefying a thermoplastic matrix component selected from the group consisting of substantially amorphous polyester resins; and dispersing a conductive component and an impact modifier in said liquified thermoplastic matrix component, the conductive component being carbon black which has a particle size in the range of about 15 to about 40 nanometers.

The invention even further relates to anti-static packaging materials comprising the blends of the invention.

The invention has the advantages of good electroconductivity, lack of brittleness, ability to thermoform into desired shapes, good impact strength, good sealing characteristics and acceptable environmental image which solves the problems in the art as previously described in addition to other problems which are readily apparent from this disclosure.

DETAILED DESCRIPTION OF THE INVENTION

The invention concerns substantially amorphous or poorly crystallizable copolyester resin compositions containing carbon black and certain impact modifiers.

More particularly, the invention relates to blends of (a) substantially amorphous, poorly crystallizable copolyesters with (b) from about 5 to about 25 weight per cent of carbon black and (c) about 7 to about 30 weight per cent of an impact modifier. The total of the addition of the percentages of components (a), (b) and (c) should be equal to 100 weight percent. More preferred ranges of additives to the copolyester include about 10 to about 18 weight percent carbon black and about 12 to about 25 weight percent of the impact modifier.

Examples of copolyesters useful in the invention include substantially amorphous or poorly crystallizable poly(ethylene terephthalate) copolyesters, poly(ethylene naphthalenedicarboxylate) copolyesters or poly(ethylene 1,4-cyclohexanedicarboxylate)copolyesters containing about 10 to about 65 mole per cent 1,4-cyclohexanedimethanol. Small amounts (approximately less than 10 mole percent) of other glycols containing from about 3 to about 10 carbon atoms may also be present. Such glycols include propylene glycol, 1,3-propanediol, 1,4-butanediol, 1,6-hexanediol, 1,8-octanediol, neopentyl glycol, 2,2,4,4-tetramethyl-1,3-cyclobutanediol, diethylene glycol and the like.

Also small amounts of modifying dibasic acids (up to about 10 mole percent) may also be present. This includes dibasic acids containing about 4 to about 40 carbon atoms and include succinic, glutaric, adipic, sebacic, suberic, dimer, isophthalic, sulfodibenzoic, sulfoisophthalic, maleic, fumaric and the like. In making the copolyesters, either the acids or the lower alkyl esters of the acids may be used.

The 1,4-cyclohexanedimethanol and 1,4-cyclohexanedicarboxylic acid components may be in the cis form, the trans form or as a mixture of cis and trans isomers. Suitable synthetic equivalents may be used such as dimethyl terephthalate. The naphthalenedicarboxylate moiety will generally be derived from 2,6-naphthalenedicarboxylic acid or its lower alkyl esters containing 1 to 4 carbon atoms. However, other naphthalenedicarboxylic acid isomers or mixtures of isomers may be used if desired. Naphthalenedicarboxylic acid isomers include the 1,2-, 1,3-, 1,4-, 1,5-, 1,6-, 1,7-, 1,8-, 2,3-, 2,4-, 2,5-, 2,6-, and 2,7- isomers. The preferred isomers are the 2,6-, 2,7-, 1,4-, and 1,5- isomers.

The polyesters of this invention are well known and are commercially available. Methods useful for their preparation are described, for example, in U.S. Pat. Nos. 2,465,319 and 3,047,539. The copolyesters of this invention may be prepared from one or more of the above dicarboxylic acids.

It should be understood that use of corresponding acid anhydrides, esters, and acid chlorides of these acids is included in the term "dicarboxylic acids".

Such copolyesters will generally be amorphous or substantially amorphous or have a low level of crystallinity (or slowly crystallizable) preferably with a degree of crystallinity of less than 20 per cent. Degree of crystallinity is roughly proportional to the endotherm on melting. The ratio between the volume of the crystalline and the amorphous areas is conventionally designated the degree of crystallization. See U.S. Pat. No. 5,330,827.

Methods for determining the degree of crystallinity are well known in the art, for example, differential scanning calorimetry (DSC), density gradient tubes, and x-ray diffraction techniques. Although any method known in the art would be acceptable to determine the degree of crystallinity, the differential scanning calorimetry method is preferred. For DSC analysis, a sample is heated and the temperature is monitored. A crystallization transition and/or crystalline melting transition in temperature is observed upon heating a crystalline material. A completely amorphous material will have no crystallization or crystalline melting transition, i.e., no definite melting point. A highly crystalline polymer will have a well defined crystalline melting temperature. The degree of crystallinity is generally determined by measuring the area under the endotherm peak.

The terms "substantially amorphous" is taken to mean having a degree of crystallinity of less than 20 percent, preferably less than 15 percent, and more preferably, less than 10 percent, as measured by any means known in the art.

These copolyesters are readily prepared by either batch or continuous processes well known to those skilled in the art. The terephthalate moiety may be derived from terephthalic acid or its lower alkyl esters such as the dimethyl ester. Useful copolyesters will have inherent viscosity (I.V.) values of about 0.5 to about 1.1 dL/g as measured at a temperature of 25° C. for a 0.5 gram sample in 100 ml of a by weight solution of 60/40 phenol/tetrachloroethane.

Typical catalysts which may be used to make these copolyesters include titanium alkoxides, dibutyl tin dilaurate, combinations of zinc, manganese, or magnesium acetates or benzoates with antimony oxide or antimony triacetate.

Carbon blacks useful in this invention have particle sizes in the range of about 15 to about 40 nanometers. Some useful carbon black materials include Vulcan® XC72 and Vulcan® P carbon black supplied by the Cabot Corp. These carbon blacks have surface areas of about 125 to about 260 square meters per gram. The carbon blacks are preferably so-called conductivity carbon blacks which not only have a very small primary particle size but also a large external and internal surface area, i.e., a high porosity and therefore high BET surfaces available for nitrogen adsorption and high dibutylphthalate (DBP) adsorption values. The specific surface of carbon black to unit mass ($m<2/g$) is determined by Nitrogen Adsorption capacity using the Brunauer-Emmet-Teller (BET procedure) which is described in the Journal of the American Chemical Society, vol. 60, page 309 (February 1938) and corresponding to French NF7 Standard 45007 (November 1987) and in U.S. Pat. Nos. 5,143,649, 4,482, 460, and 4,066,576, the disclosures of which are incorporated herein by reference.

In addition, the carbon black materials useful in this invention are highly structured, i.e., they have a strong tendency to agglomeration or aggregation of individual particles to form larger structures, e.g. in the form of chains. The BET surface areas of the carbon blacks are generally greater than 20 $m^2/g$ and the DBP adsorption is generally above 40 ml per 100 g of carbon black. Conductivity carbon blacks with BET surfaces above 50 m2/g and DBP absorptions greater than 80 ml/100 g and average primary particle sizes below 50 nanometers (nm) are particularly suitable. Electronically conductive carbon blacks of this kind are commercially available as special grade carbon blacks with a pronounced structure and high electrical conductivity.

Useful impact modifiers for the blends include styrene-ethylene/butylene-styrene block copolymers (SEBS) which have been functionalized with maleic anhydride, ethylene methacrylic acid copolymers and butadiene/acrylic monomer shell core polymers. One suitable functionalized SEBS impact modifier is KRATON® FG 1901X supplied by the Shell Chemical Co. It has been found that the SEBS type block copolymers are more thermally stable during processing operations than those containing isoprene or butadiene as the midblock.

Suitable saponified ethylene/methacrylic acid copolymer impact modifiers include SURLYN® ionomer resins supplied by DuPont Polymer Products.

Useful butadiene/acrylic monomer shell core impact modifiers include Paraloid® compositions based on butyl acrylate or methyl acrylate supplied by Rohm and Haas. These impact modifiers also aided significantly in the dispersion of the carbon black in the blends.

Other impact modifiers suitable for this invention include ethylene vinyl acetate ELVAX® copolymers supplied by DuPont Company, polyester or polyether polyurethanes such as Pellethane® supplied by Dow Chemical.

Polyester elastomers useful as impact modifiers include Hytrel® polyester elastomers supplied by DuPont Company and ECDEL® copolyester ether supplied by Eastman Chemical Company.

The blends of this invention are generally prepared by a method comprising the steps of:
  liquefying a thermoplastic matrix component selected from the group consisting of at least one amorphous copolyester resin; and
  dispersing a conductive component such as carbon black and the impact modifiers useful in the blends of the invention in the liquefied thermoplastic matrix component.

The carbon black and the impact modifiers as well as any other components useful for the blends of this invention are also believed to be useful in the method of this invention.

More particularly, the blends of this invention are readily prepared in conventional blending equipment such as Brabender Plastograph Mixers, single screw extruders, twin screw extruders and the like. The twin screw Werner & Pfleiderer extruder is particularly preferred.

The blends of this invention are readily prepared at melt temperatures of about 230 to about 260 degrees Centigrade. These low processing temperatures are beneficial in preventing thermal degradation of the blends. Highly crystalline polyesters such as PET and PBT require much higher processing temperatures.

Small amounts of other ingredients may be added to the compositions of the present invention to enhance the performance properties of the blends. For example, surface lubricants, denesting agents, stabilizers, antioxidants, ultraviolet light absorbing agents, mold release agents, metal deactivators, phosphorus containing stabilizers, zeolites, fillers, and the like can be used so long as they do not hinder the present invention from accomplishing its objectives.

The blends of this invention are readily extruded into 8 to 10 mil sheeting using a 20 mil die gap at temperatures of about 230 to about 260 degrees Centigrade. Generally the draw down ratio is generally maintained at about 2:1 (diameter:depth ratio). Sometimes polishing of the surface of the sheet is required to remove surface roughness caused by the presence of the impact modifier.

These extruded sheets have good toughness and appearance. They generally have a surface resistivity value of about $1\times10^4$ to about $1\times10^5$ Ohms. The sheets are readily thermoformed at a sheet temperature of about 230 degrees Fahrenheit (110 degrees Centigrade) to about 360 degrees Fahrenheit (182 degrees Centigrade) to provide useful packaging forms. They are highly useful for the packaging of a variety of articles including computer chips, disc drive heads, and the like. In order to be useful for packaging sensitive electronic parts such as computer chips, it is generally required that the packaging container have a surface resistivity value of less than about $1\times10^7$ Ohms.

These blends are highly useful for a variety of packaging forms, including but not limited to thermoformed or extruded packaging, such as tape and reel packaging, tote bins, trays, equivalents thereof, etc.

Percentages expressed herein refer to weight percentages unless other specified. The term (I.V.) refers to inherent viscosity expressed in dL/g measured as described herein.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLE 1

A melt blend was prepared on a Werner & Pfleiderer twin screw extruder consisting of 67 weight per cent of a terephthalic copolyester containing 69 mole per cent ethylene glycol and 31 mole percent 1,4-cyclohexanedimethanol (I.V.=0.75), 18 weight per cent of Vulcan® XC72 carbon black, and 15 weight per cent of Kraton® FG1901X impact modifier. The compounded product was extruded into 10-mil (250 micron) film using a single screw extruder with a coathanger die having an 18-mil (450 micron) die gap at set temperatures on the extruder barrel of 250 degrees Centigrade. The resulting polished film had good surface appearance and resulted in sheet surface resistivity measurements of $1\times10^5$ Ohms as measured by Electronic Industries Association test procedure EIA 541. The sheet was thermoformed at sheet temperatures of 160 degrees Centigrade utilizing a 2:1 draw ratio. Surface resistivity after thermoforming was $1\times10^7$ Ohms. The sheet sample had good toughness which enabled slitting the extruded sheet to narrow widths in the machine (extrusion) direction of the sheet without resulting breakage. Similarly good results were achieved using a copolyester sample having an I.V. of 0.82 dL/g.

EXAMPLE 2

A melt blend consisting of 67 weight per cent of a copolyester based on terephthalic acid, 38 mole per cent ethylene glycol and 62 mole per cent 1,4-cyclohexanedimethanol (I.V.=0.75), 14 weight per cent of Vulcan® XC72 carbon black and 19 weight per cent of Paraloid® EXL-3361 acrylic impact modifier was prepared as described in example 1. The compounded product was extruded into 10-mil (250 micron) film using a single screw extruder with a die gap of 20 mils (500 microns) at set temperatures on the extruder barrel of 260 degrees Centigrade. The resulting polished film had good surface appearance and resulted in sheet surface resistivity measurements of $1\times10^5$ Ohms as measured by Electronic Industries Association test procedure EIA 541. The sheet was thermoformed at sheet temperatures of 160 degrees Centigrade utilizing a 2:1 draw ratio. Surface resistivity after thermoforming was 1×10⁷ Ohms. The sheet had good toughness which enabled slitting the extruded sheet to narrow widths in the machine (extrusion) direction of the sheet without resulting breakage.

EXAMPLE 3

A melt blend consisting of 67 weight per cent of a copolyester based on terephthalic acid, 69 mole per cent ethylene glycol and 31 mole per cent 1,4-cyclohexanedimethanol (I.V.=0.75), 18 weight per cent of Vulcan® XC72 carbon black and 15 weight per cent of Kraton® D2104 SBS impact modifier was prepared on a Werner & Pfleiderer twin screw extruder. 10-mil (250 micron) sheet could not be produced from the compounded product using a single screw extruder with a die gap of 18 mils (450 microns) at set temperatures on the extruder barrel of 250 degrees Centigrade due to inability to wind the film due to brittleness of the product.

EXAMPLE 4

A melt blend consisting of 86 weight per cent of a copolyester based on terephthalic acid, 69 mole per cent ethylene glycol and 31 mole per cent 1,4-cyclohexanedimethanol and 14 weight per cent of Vulcan® XC72 carbon black was prepared on a Werner & Pfleiderer twin screw extruder. 10-mil (250 micron) sheet could not be produced from the compounded product using a single screw extruder with a die gap of 18 mils (450 microns) at set temperatures on the extruder barrel of 250 degrees Centigrade due to the inability to wind the film due to brittleness of the product.

EXAMPLE 5

Using the procedure of Example 1, a melt blend of 60 weight percent of a poly(ethylene 2,6-naphthalenedicarboxylate) copolyester containing 40 mole percent of a 30/70 cis/trans mixture of 1,4-cyclohexanedimethanol (I.V. 0.69), 16 weight percent of VULCAN® XC 72 carbon black and 24 weight percent of KRATON®FG 1901X impact modifier is prepared. Extruded sheeting (10 mil thickness) is prepared at a melt temperature of 255° C. This sheeting is readily thermoformed into trays having good appearance.

Similarly good results are achieved using ECDEL® copolyester ether impact modifier (supplied by Eastman Chemical Company) instead of the KRATON® impact modifier.

EXAMPLE 6

Using the procedure of Example 1, a melt blend of 65 weight percent of a poly(ethylene terephthalate) copolyester containing 12 mole percent 1,4-cyclohexanedimethanol (I.V. 0.70), 17 weight percent of VULCAN® P carbon black and 18 weight percent of SURLYN®1601-2 ionomer resin (melt flow index 1.3) a sodium neutralized ethylene/methacrylic acid copolymer supplied by DuPont Polymer Products is prepared. Extruded sheeting (10 mil thickness) is prepared at a melt temperature of 250° C. This sheeting is readily thermoformed into trays having good appearance.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A blend comprising:
   (a) one or more substantially amorphous copolyester resins having a degree of crystallinity of less than 20 percent;
   (b) from about 5 to about 25 weight percent carbon black; and
   (c) from about 7 to about 30 weight percent of an impact modifier,
   wherein said impact modifier is selected from the group consisting of maleic anhydride modified styrene-ethylene/butylene-styrene block copolymers, styrene-ethylene/propylene-styrene block copolymers, and butadiene/acrylic monomer shell core polymers which are based on butyl acrylate and methyl acrylate,
   wherein the total of the weight percentages of (a), (b), and (c) equal 100 percent.

2. The blend of claim 1 wherein said substantially amorphous copolyester resins are selected from the group consisting of copolyesters of polyalkylene terephthalates, copolyesters of polyalkylene naphthalenedicarboxylates and copolyesters of polyalkylene 1,4-cyclohexanedicarboxylates.

3. The blend of claim 2 wherein said substantially amorphous copolyester resins are selected from the group consisting of copolyesters of polyalkylene terephthalates.

4. The blend of claim 3 wherein at least one of said copolyesters is a polyethylene terephthalate.

5. The blend of claim 4 wherein at least one of said copolyesters of polyethylene terephthalate contains from 10 to 65 mole per cent of 1,4-cyclohexanedimethanol.

6. The blend of claim 2 wherein said substantially amorphous copolyester resins are selected from the group consisting of copolyesters comprising 2,6-naphthalenedicarboxylic acid.

7. The blend of claim 6 wherein at least one of said copolyesters of 2,6-naphthalenedicarboxylic acid comprises 2,6-naphthalenedicarboxylic acid and an aliphatic glycol.

8. The blend of claim 7 wherein said copolyesters comprise 2,6-naphthalenedicarboxylic acid and ethylene glycol.

9. The blend of claim 7 wherein said copolyesters comprise 5 to 100 mole percent 2,6-naphthalenedicarboxylic and up to 90 mole percent aliphatic glycol wherein the total of the mole percentages of diacid and glycol each equal 100 mole percent.

10. The blend of claim 1 wherein said impact modifier is selected from the group consisting of maleic anhydride modified styrene-ethylene/butylene-styrene block copolymers, styrene-ethylene/propylene-styrene block copolymers, ethylene methacrylic acid copolymers, butadiene/acrylic monomer shell core polymers, ethylene/vinyl acetate copolymers and polyester elastomers.

11. The blend of claim 10 wherein said impact modifier is selected from the group consisting of maleic anhydride modified styrene-ethylene/butylene-styrene block copolymers, and styrene-ethylene/propylene-styrene block copolymers.

12. The blend of claim 1 wherein said carbon black has a particle size in the range of about 15 to about 40 nanometers.

13. The blend of claim 12 wherein said carbon black has a surface area of about 125 to about 260 square meters per gram.

14. A carbon-containing molded article produced by extrusion or by injection molding and comprising the blend of claim 1.

15. The method of preparing the blend of claim 1 comprising the steps of:

liquefying a thermoplastic matrix component comprising one or more substantially amorphous copolyester resins, wherein said liquefying occurs by processing the thermoplastic matrix component through a twin screw extruder at melt temperatures of from about 230° C. to about 260° C.; and dispersing a conductive component and said impact modifier in said liquified thermoplastic matrix component, said conductive component being said carbon black which has a particle size in the range of about 15 to about 40 nanometers.

16. Anti-static packaging material comprising the blend of claim 1.

17. The anti-static packaging material of claim 16 wherein said material is capable of dissipating an electrostatic charge across the surface of the packaging material.

18. The anti-static packaging material of claim 17 selected from the group consisting of thermoformed or injection molded packaging material.

19. The antistatic packaging material of claim 18 wherein said thermoformed or injection molded packaging material is selected from the group consisting of tape and reel packaging, tote bins, and trays.

* * * * *